(12) United States Patent
Tammi

(10) Patent No.: US 8,121,597 B2
(45) Date of Patent: Feb. 21, 2012

(54) METHOD OF REGISTERING AND DEREGISTERING A USER

(75) Inventor: Kalle Tammi, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/109,565

(22) Filed: Mar. 27, 2002

(65) Prior Publication Data
US 2004/0203763 A1 Oct. 14, 2004

(51) Int. Cl.
H04W 4/00 (2009.01)
(52) U.S. Cl. ............... 455/435.1; 455/435.2; 455/435.3; 455/456.1
(58) Field of Classification Search ............ 455/456, 455/460, 417, 456.1, 435.1–435.3, 435; 342/357.09; 370/329; 709/232, 223
See application file for complete search history.

(56) References Cited

U.S. PATENT DOCUMENTS

| | | | | |
|---|---|---|---|---|
| 5,848,055 | A | 12/1998 | Fedyk et al. | 370/228 |
| 6,456,234 | B1 * | 9/2002 | Johnson | 342/357.09 |
| 6,535,493 | B1 * | 3/2003 | Lee et al. | 370/329 |
| 6,539,224 | B2 | 3/2003 | Schmitz et al. | 455/435 |
| 6,763,233 | B2 * | 7/2004 | Bharatia | 455/433 |
| 6,810,243 | B2 * | 10/2004 | Torabi | 455/417 |
| 6,871,070 | B2 * | 3/2005 | Ejzak | 455/435.1 |
| 7,170,863 | B1 * | 1/2007 | Denman et al. | 370/260 |
| 2002/0037723 | A1 * | 3/2002 | Roach | 455/435 |
| 2003/0061372 | A1 * | 3/2003 | Agarwalla et al. | 709/232 |
| 2004/0122934 | A1 * | 6/2004 | Westman et al. | 709/223 |
| 2004/0152444 | A1 * | 8/2004 | Lialiamou et al. | 455/406 |

FOREIGN PATENT DOCUMENTS

| | | |
|---|---|---|
| CN | 1303184 A | 7/2001 |
| EP | 1 083 765 A2 | 3/2001 |
| JP | 2003-519452 | 6/2003 |
| JP | 2004-506359 | 2/2004 |
| RU | 2154905 | 8/2000 |
| RU | 2173503 | 9/2001 |
| WO | 9938083 | 7/1999 |
| WO | WO 99/38083 A1 | 7/1999 |
| WO | WO 01/10109 | 2/2001 |
| WO | WO 02/13567 | 2/2002 |

OTHER PUBLICATIONS

3GPP TS29.229 v1.1.0, CX and DX Interface Based on Diameter Protocol; Protocol Details (Release 5), (Mar. 2002).
3GPP TS 29.228 v1.1.0 (Mar. 2002); Technical Specification Group Core Network; IP Multimedia (IM) Subsystem CX and DX Interfaces; Signalling Flows and Message Contents (Release 5).

(Continued)

Primary Examiner — Wayne Cai
(74) Attorney, Agent, or Firm — Ware, Fressola, Van Der Sluys & Adolphson LLP

(57) ABSTRACT

The invention comprises a method for registering and deregistering user equipment from a communications system and comprises the steps of sending a request to a first node to register or deregister the user equipment from or to the communications system, determining at the first node to determine if the request is a request to register or a request to deregister, and carrying out at one least predetermined operation at a second node only if the request is a request to register.

19 Claims, 5 Drawing Sheets

OTHER PUBLICATIONS

3GPP TS 29.228 v1.1.0 (Mar. 2002); 3rd Generation Partnership Project; Technical Specification Group Core Network; IP Multimedia (IM) Subsystem Cx and Dx Interfaces; Signalling Flows and Message Contents (Release 5).

3 GPP TS 29.229 v1.1.0 (Mar. 2002); 3rd Generation Partnership Project; Technical Specification Group Core Network; Cx and Dx Interfaces Based on the Diameter Protocol; Protocol Details (Release 5).

The State Intellectual Property Office of the People's Republic of China; Jie Ma; "Notification of the Fourth Office Action"; Feb. 28, 2011; whole document (English translation).

European Patent Office; Möll, Hans-Peter; "Communication pursuant to Article 94(3) EPC"; whole document; Jan. 17, 2011; Munich, Germany.

3GPP; "3$^{rd}$ Generation Partnership Project; Technical Specification Group Services and System Aspects; IP Multimedia (IM) Subsystem—Stage 2 (Release 5); 3GPP TS 23.228 V5.1.0"; pp. 1-135; Jun. 1, 2000; XP002213956.

* cited by examiner

METHOD OF REGISTERING AND DEREGISTERING A USER

FIELD OF THE INVENTION

The present invention relates to a method of registering and deregistering a user to and from a communications network and in particular but not exclusively a method for use with a wireless communications network.

BACKGROUND OF THE INVENTION

A communication system can be seen as a facility that enables communication between two air more entities such as user equipment and other nodes associated with the system. A communication system typically operates in accordance with a given standard or specification which sets out what the various elements of the system are permitted to do and how that should be achieved. For example, the standard or specification may define if the user, or more precisely the user equipment or terminal, is provided with a packet switch server and/or a circuit switch server. Communication protocol and/or parameters which are used for the connection may also be defined. In other words, a specific set of "rules" in which the communication can be made need to be defined in order to enable communication by means of the system.

Communication systems providing wireless communication for the user terminal or other nodes are known. An example of the wireless system is a cellular network. In cellular systems, a base transceiver station (BTS) or similar access entity serves mobile stations (MS) or similar wireless user equipment (UE) via a wireless interface between these entities. The operation of the base station and the nodes required for the communication can be controlled by one or several control entities. The various control entities may be interconnected. One or more gateway nodes may also be provided for connecting the cellular network to other networks such as to a public switched telephone network (PSTN) and/or other communication networks such as an IP (internet protocol) and/or other packet switch network.

A communication system may be adapted to provide wireless data communication services. A communication system may be adapted to provide wireless data communication services such as packet switched (PS) services for a mobile station. Examples of systems enabling wireless data communication services, without limitation to these include the general packet radio service (GPRS), the enhanced data rate for GSM evolution (EDGE) mobile data network, the so-called third generation (3G) telecommunication systems such as the universal mobile telecommunication system (UMTS), i-phone or IMT-2000 (international mobile telecommunication) and the terrestrial trunked radio (TETRA) system.

In the third generation system, it has been proposed to provide multimedia network architecture. It is intended that a multimedia architecture be able to handle different kinds of data such as voice, audio, video, data per se and indeed any other type of media. It has been proposed to have an IP (internet protocol) multimedia subsystem for such network architecture. Thus, the subsystem of the architecture is arranged to transfer the data between the various entities in packet data form, in accordance with the internet protocol.

More particularly, the IP multimedia subsystem comprises core network elements for the provision of a multimedia service This includes the collection of signalling and bearer related network elements. The IP multimedia core network is arranged to enable PLMN operators to offer their subscribers multimedia services based on and build upon internet applications, services and protocols. It is intended that the IP multimedia core network subsystem should enable convergence of and access to voice, video, messaging, data and web based technology for wireless users. The proposed third generation multimedia network architecture may have several different servers for handling different functions. These includes functions such as the call state control functions (CSCF). This function is sometimes called the session control function. The call state control function may comprise functions such as a proxy call state control function (P-CSCF), interrogating call state control function (I-CSCF) and serving call state control function (S-CSCF). Control functions may also be provided by entities such as a home subscriber server (HSS) and various application services.

Reference is made to the current versions of the third generation specifications: Third Generation Partnership Project; Technical Specification Group Core Network; CX and DX Interlace Based on the Diameter Protocol; (release 5), 3GPP TS29.229 V1.1.0 and IP Multimedia (IM) Subsystem CX and DX Interfaces; Signalling Flows and Message Contents; (release 5) 3GPP TS29.228 V1.1.0. Both of these specifications are herein incorporated by reference. In these specifications, a CX interface is defined. The CX interface is the interface between the home subscriber server and the interrogating call state control functions. The CX interface, is also the interface between the home subscriber server and the serving call state control function. In the currently proposed specifications, the same message is used both to register a user and to deregister a user. At present it cannot be distinguished whether the message is to register or to deregister. Accordingly, every time this message is received by a CSCF, the HSS needs to check if the user really exists and that the user is allowed to register to a particular visited network. The HSS also checks to see if a CSCF has already been assigned. Accordingly, with the currently proposals, the user will send a register message, if the user wants to register or deregister. Regardless of whether the user is registering or deregistering, all of the checks will be made by the HSS.

It has been appreciated by the inventor that all of these checks are not required for deregistration. Thus, the use of the same message for registration and deregistration is disadvantageous in that unnecessary processing is required. This unnecessarily slows down the process of deregistration and also unnecessarily uses up the HSS resources.

SUMMARY OF THE INVENTION

It is therefore in aim of embodiments of the present invention to address or at least mitigate one of the problems described above.

According to a first aspect of the present invention, there is provided a method for registering and deregistering user equipment from a communications system comprising the steps of sending a request to a first node to register or deregister said user equipment from or to said communications system, determining at the first node to determine if said request is a request to register or a request to deregister, and carrying out at least one predetermined operation at a second node only if said request is a request to register.

According to a second aspect of the present invention, there is provided a method for registering and deregistering user equipment to and from an IP multimedia communications system comprising the steps of sending a request to a call state or session control function node to register or deregister said user equipment from said user equipment, and checking at the node to determine if said request is a request to register or a request to deregister.

According to a third aspect of the present invention, there is provided a communications system comprising at least one user equipment arranged to register and deregister with a network, a first node arranged to check if a request from a user equipment is a request to register or a request to deregister, and a second node arranged to carry out at least predetermined check at a second node only if said request is a request to register.

According to a fourth aspect of the present invention, there is provided a first node for use in a communications system to which at least one user equipment arranged to register and deregister, said first node comprising means for checking if a request from a user equipment is a request to register or a request to deregister, and means for sending a message to a second node, the first node being arranged to include an indication in said message indicating if the user equipment is registering or deregistering.

According to a further aspect of the present invention, there is provided a second node for use in a communications system to which at least one user equipment arranged to register and deregister, said second node comprising means for receiving a message from a first node including an indication indicating if a user equipment is registering or deregistering, and carrying out a predetermined check only if the use equipment is registering.

According to a further aspect of the present invention, there is provided a second node for use in a communications system to which at least one user equipment arranged to register and deregister, said second node comprising means for receiving a message from a first node including an indication indicating if a user equipment is registering or deregistering, and carrying out a check to determine if the user equipment is permitted to use a network to which it is currently attached only if the user equipment is registering.

BRIEF DESCRIPTION OF THE DRAWINGS

For a better understanding of the present invention and as to how the same may be carried into effect reference will now be made by way of example to the accompanying drawings in which.

DESCRIPTION OF PREFERRED EMBODIMENTS OF THE PRESENT INVENTION

Figure 1:
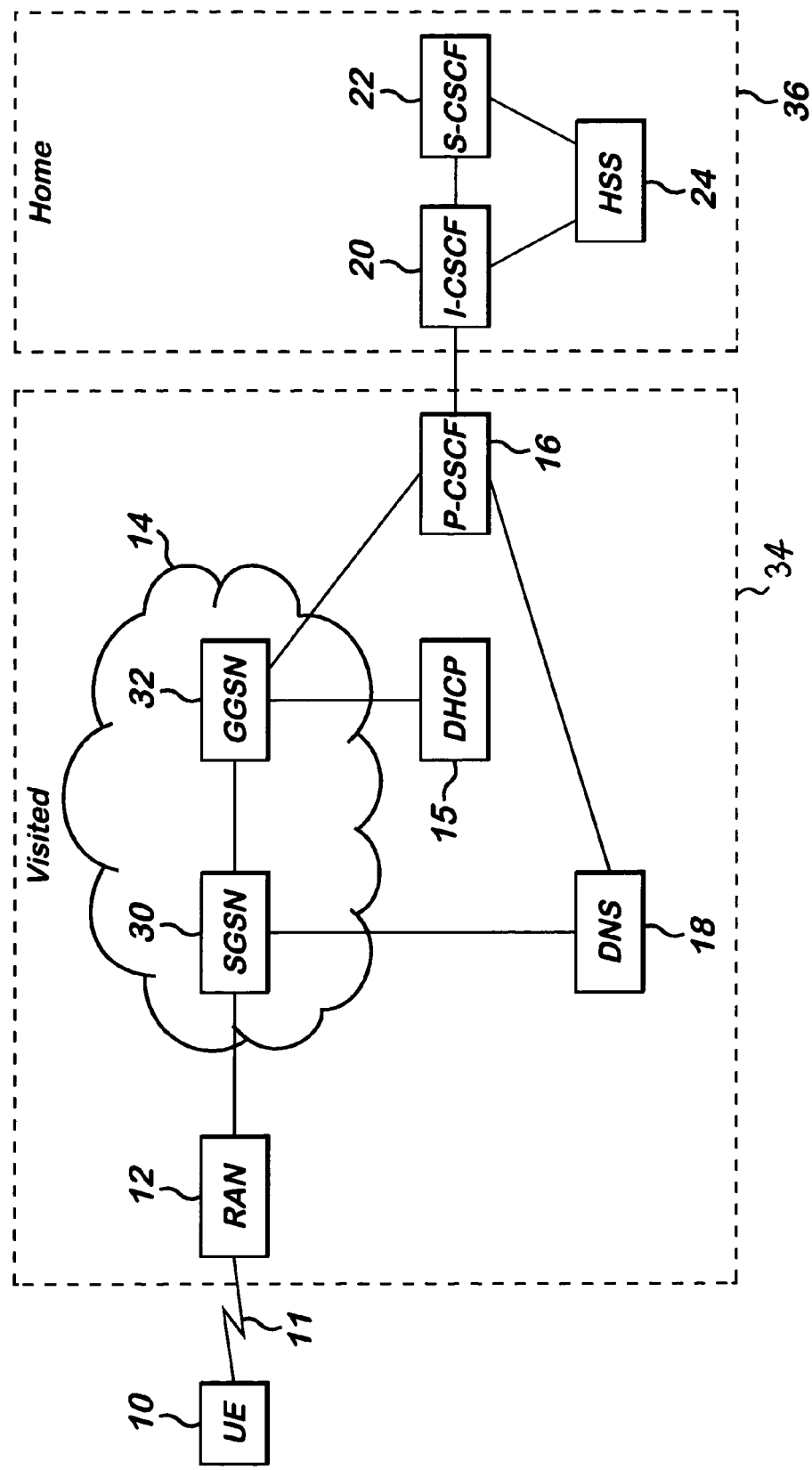
FIG. 1 shoves a communication system architecture in which embodiments of the present invention can be incorporated.

Reference is made first to FIG. 1 which shows a possible network system architecture in which embodiments of the present invention can be incorporated. The exemplifying network system is arranged in accordance with UMTS 3G specifications. However, it should be appreciated that alternative embodiments of the present invention may be used with other third generation specification or indeed with any other suitable standard. A user equipment 10 is connectable to a radio access network 12. This connection between the user equipment 10 and the radio access network 12 is via a wireless connection 11. The user equipment 10 can take any suitable form and may for example be a mobile telephone, a portable computer, a personal digital assistant (PDA) or any other suitable wireless equipment. The wireless equipment may or may not be mobile.

The radio access network 12 consists of at least a base station and usually also a controller. The radio access network 12 is connected to a GPRS core networks For example, the RAN 12 may be connected to an SGSN 30 (serving GPRS support node). The SGSN 30 in turn may be connected to a GGSN 32 (gateway GPRS support nodes. The GGSN and SGSN constitute the GPRS network 14. The GGSN is connected to the DHCP (dynamic host configuration protocol) 15. The DHCP 15 is used to provide user equipment 10 with a domain name of a proxy-CSCF node 16. The P-CSCF node 16 is connected to the GGSN 32. The domain name server DNS 18 is connected to the P-CSCF 16 and to the SGSN 30. The elements marked in box 34 can be regarded as being a visited network, that is the RAN 12, the SGSN 30, the GGSN 32, the DNS 18, and P-CSCF.

The home network is marked in block 36. The home network 36 is the network with which the user is associated and from which the user is billed etc. The connection between the visited and home networks are via the P-CSCF 16 of the visited network and in I-CSCF 20 of the home network. Between the P-CSCF 16 and I-CSCF 20 is a backbone network or other form of connection The I-GSCF of the home network 20 is connected to an S-CSCF 22. Both of these CSCFs 20 and 22 are connected to the HSS 24. The S-CSCF 22 is the serving call state control function and is a server currently serving at least one of the user equipment and is in control of the status of that user equipment The home subscriber server entity 24 is used for storing registration identities, similar user related information and the like.

Figure 2:
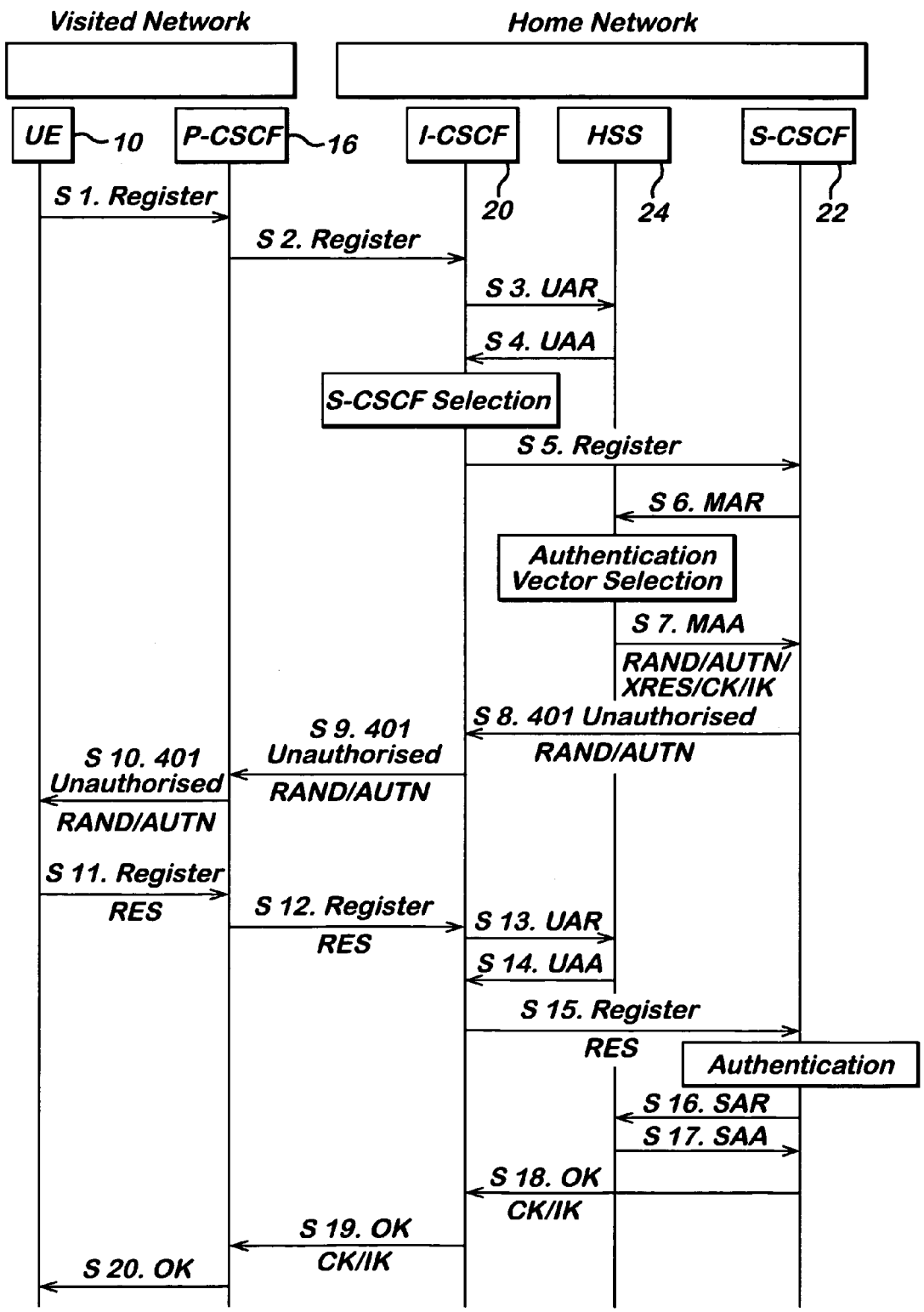
FIG. 2 shows an information flow in accordance with the currently proposed specification for registration.

Reference will now be made to FIG. 2 which shows the current procedure for registering a user.

In step S1, the user equipment 10 sends a register request from the user equipment to the P-CSCF 16. The purpose of this request is to register the user's SIP (session initiation protocol) uniform resource identifier with a CSCF 22 in the home network. This request is routed to the P-CSCF 16 because it is the contact point with the IP multimedia subsystem for the user equipment. The register message may include the following information: private identity, public identity, home domain name and the requested expiration time of the registration; content length, destination domain for the request; the IP address of SIP session allocated; the IP address of the user and authorisation information.

In step S2, the P-CSCF 16 determines that the user equipment 10 is registering from a visiting domain and performs a domain name server query DNS18 to locate the I-CSCF 20 in the home network. The lookup table in the DNS 18 is based on an address specified in the URL of the request. The P-CSCF 16 sends the register request, originating from the user equipment 10 to the I-CSCF 20 identified. In step S3, the CSCF 20 makes a request for information relating to the subscriber (ie the user) registration status by sending a query to the HSS in the form of a user authorization request (UAR) command. This request is sent to the HSS in order to request the authorization of the registration of a multimedia user the HSS 24 validates whether identities provided for example private or public identities, belong to the same user. Additionally, the HSS 24 may check whether the user has already registered anchor whether the user is authorization to register in the network where the user is roaming.

In step S4, the HSS sends a reply to the I-CSCF in the form of a user authorization answer (UAA) command. If the user has been authorized to register and a server is already assigned to it, the message will contain the SIP URL of the server so that the registration request can be forwarded. If the user has been authorized and the server has not yet been assigned, instead server capability information may be provided which can be used for the selection of the server that will perform the control of the services for the multimedia user.

This information is sent from the HSS 24 to the I-CSCF 20.

Based on the information received from the HSS 24, the I-CSCF 20 selects the appropriate S-CSCF 22. Where the S-CSCF 22 is not identified, the I-CSCF uses the capability information provided by the HSS to choose an appropriate S-CSCF. Where the HSS 24 provides information identifying the S-CSCF, then the identified S-CSCF is used. In step S5, the I-CSCF 20 forwards the register message to the selected S-CSCF 22.

In step S6, a multimedia authorization request (MAR) is sent from the S-CSCF 22 to the HSS 24 in order to request security information.

The HSS 24, in response to the MAR command, selects an authentication vector to be used in order to challenge the user. The S-CSCF may also indicate to the HSS 24 that it has been assigned to serve the particular user, in the step S6.

In step S7, the HSS sends a multimedia authentication answer MAA command to the S-CSCF which provides the requested authentication vectors.

In step S8, the S-CSCF sends an authentication challenge to the I-CSCF 20 including the provided authentication vector. In step S9, the challenge is forwarded by the I-CSCF 20 to the P-CSCF 16.

In step S10, the authentication challenge is forwarded by the P-CSCF 16 to the user equipment 10.

In step S11, the user equipment 10 generates a response to the authentication challenge and sends back response to the P-CSCF 16 in a further register message. Steps S12 to 315 are similar to steps S2 to S5 and are carried out to forward the register message to the S-CSCF 22. The S-CS3F 22 then carries out an authentication procedure based on the response from the user equipment. In step S16, the S-CSCF 22 sends a server assignment request (SAR) command This effectively requests that the HSS 24 indicate that the S-CSCF 22 is serving a particular user. In step S17, a server assignment answer is sent from the HSS to the S-CSCF 22 which effectively provides confirmation that the S-CSCF 22 is to provide the required service to the user. In step S18, a message is sent from the S-CSCF 22 to the I-CSCF 20 effectively confirming the user is registered This message is forwarded by the I-CSCF to the P-CSCF in step S19 and from the P-CSCF 16 to the user equipment 10 in step S20.

Figure 3:
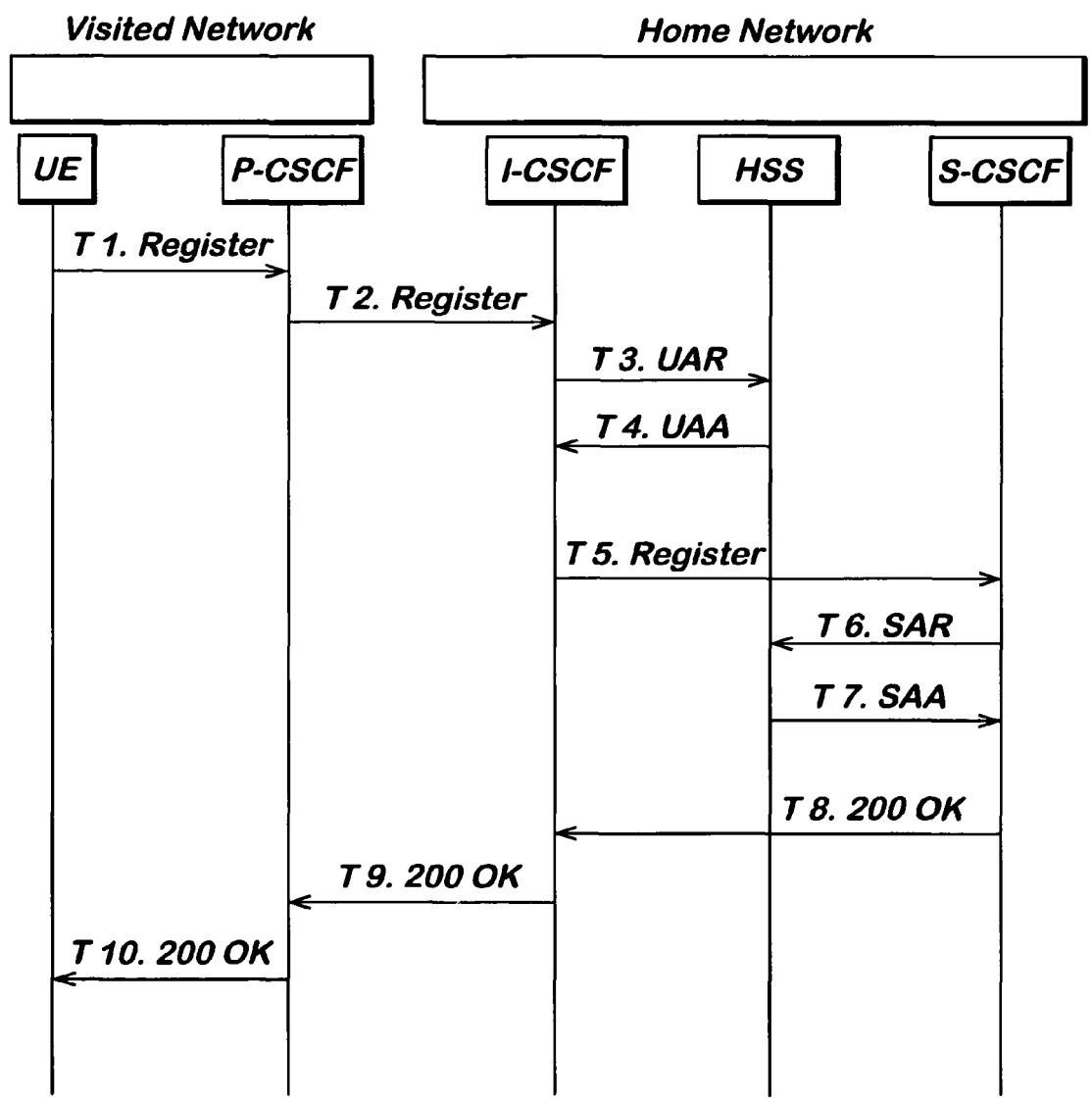
FIG. 3 shows an information flow in accordance with the currently proposed specification for registration.

Reference will now be made to FIG. 3 which shows the procedure for the deregistration of an already registered user. Steps T1 to T5 are similar to steps S1 to S5 of FIG. 2. However, there is no need to do the S-CSCF selection as this will have already been done. As the user is already registered, the next step after step T5 will be steps T6 and T7 which are the same as steps S16 and S17 of FIG. 2.

The register message sent by the user equipment contains information that the user equipment wishes to deregister. Nevertheless, the I-CSCF still needs to interrogate the HSS and the HSS still needs to provide the correct command The SAR command in step T6 will indicate to the HSS that the user is deregistering. This is only after the HSS has been interrogated for example to check if the user is permitted to roam to the network to which it is currently attached. The HSS will be suitably updated. The SPA message in step T7 confirms to the s-CSCF that the mobile station can be deregistered. Steps T8 to T10 are the forwarding of the acknowledgement of this to the mobile station.

Reference will now be made to an embodiment of the present invention. In embodiments of the present invention, the register procedure is as outlined in relation to FIG. 2. However, a different procedure is provided for the deregistration procedure. In his regard, reference is made to FIG. 4.

Figure 4:
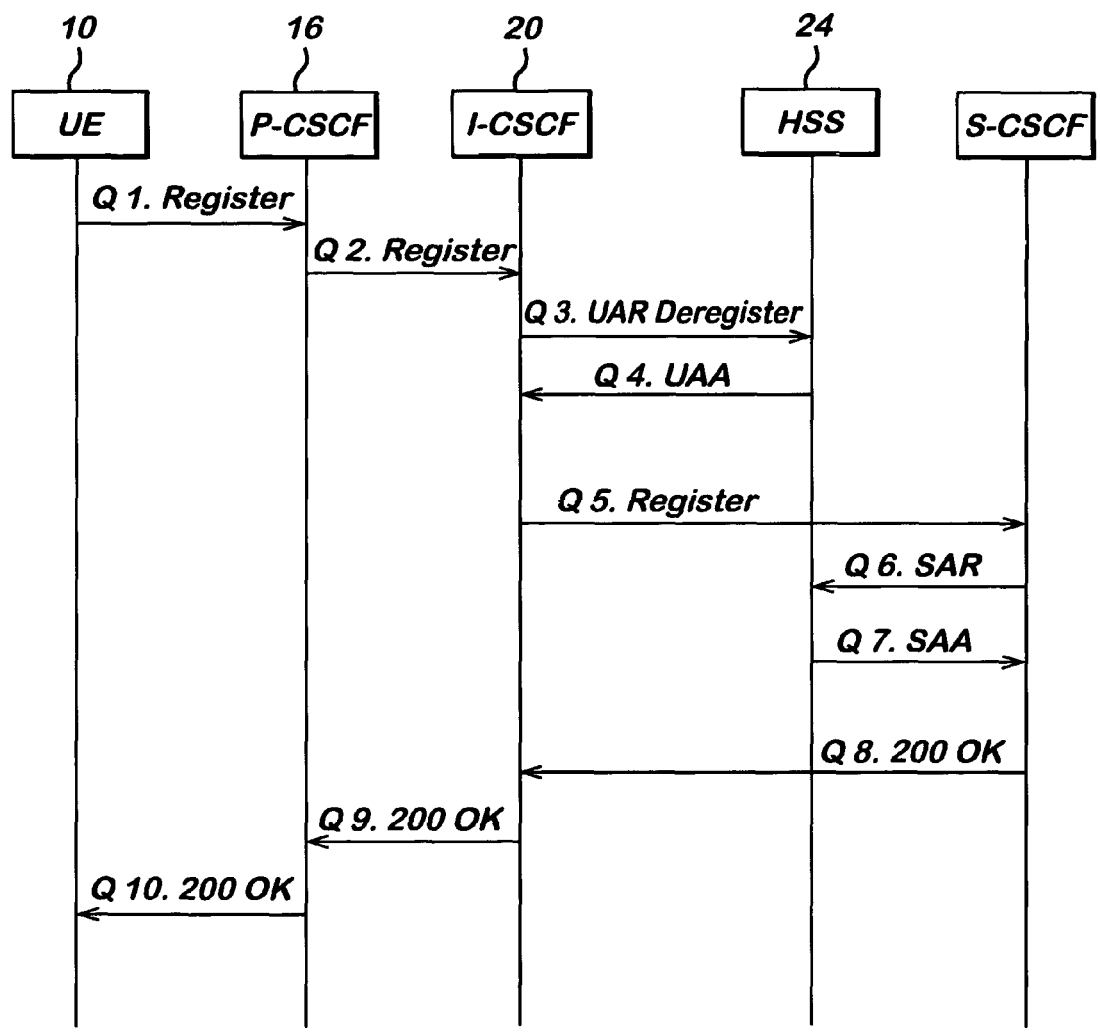
FIG. 4 shows an information flow in accordance with an embodiment of the present invention.

FIG. 4 shows the signal flow during a deregistration procedure. In the first step 01, a register message is sent from the user equipment to the P-CSCF 16. This is the same as step S1 in FIG. 2. In step Q2, the P-CSCF sends the register message to the I-CSCF 20. Again, this is the same as step S2 in FIG. 2.

Figure 5:
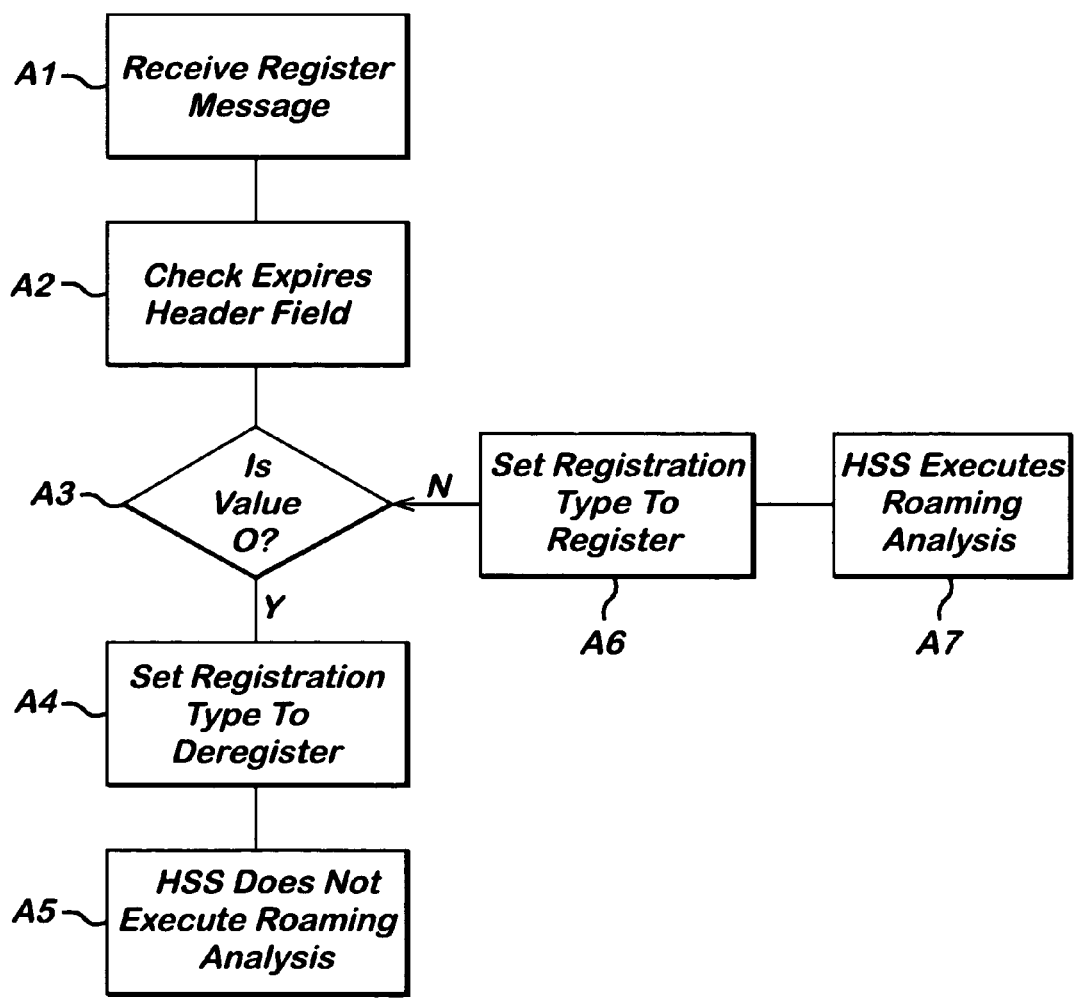
FIG. 5 shows a flow chart of a method embodying the present invention.

Reference is made to FIG. 5 which shows the method carried out by the I-CSCF 20. In step A1, the register message is received in step A2, the I-CSCF 20 checks the value of then expires header field which contains the requested expiry time in the SIP REGISTER message In particular in step A3, the I-CSCF checks if the value is 0. If it is, the next step is A4. The value 0 is taken to indicate that the message is a deregister message. If it is determined that the message is a deregister message then an attribute or field in a UAR message is set to indicate that the message is a deregistration message. That message is sent in step Q3 to the HSS 24. If the UAR message received indicates that the message is a deregister message then the HSS does not carry out the roaming analysis, that is the determination as to whether or not the user equipment is entitled to operate with the network to which it is currently attached.

If the value is determined in step A3 not to be 0, then the next step is A6. The registration type in the UAR message is set to indicate that the message is a register message. On receipt of the UAR message, in step A7, the HSS will carry out the roaming analysis. It should be appreciated that the UAR message sent in step Q3 to the HSS 24 from the I-CSCF 20 is similar to that sent in step S3 with the additional information as to whether or not the user wishes to register or deregister. Alternatively it can be exactly the same as in step S3 as long as there has been defined different messages for registration and deregistration.

As mentioned already, the HSS will not carry out a roaming analysis if the message is a deregister message. The next step will be step Q4 which is the same as step S4 in FIG. 2. The next step of involves the I-CSCF sending the register message to the S-CSCF. Steps Q6 to Q10 are the same as steps T6 to T10 of FIG. 3.

It should be appreciated that the UAR message embodying the present invention will have may have the following fields:
  Diameter header
  Session identity
  Authorized application identity
  Authorized session state
  Origin host
  Origin realm
  Destination host
  Destination realm
  User name
  Public identity
  Visited network identity
  Registration type—whether or not the message is a registration or deregistration message Embodiments of the present invention have been described particularly in relation to a third generation telecommunications system. It should be appreciated that alternative embodiments of the present invention may be used in any suitable standard. Embodiments of the present invention have been described in the context of an IP multimedia subsystem.

It should be appreciated that embodiments of the present invention may be used with any other system.

The invention claimed is:

1. A method comprising:
receiving from an interrogating call session control function node of a home network at a home subscriber server of said home network a user authorization request message comprising an attribute indicating the result of a determination at the interrogating call session control function node as to whether a request to register or deregister to or from a visiting network a user equipment associated with said home network is a request to register or a request to deregister; and
carrying out a roaming analysis at said home subscriber server of said home network only when said attribute comprised in said message indicates that said request is a request to register, wherein said roaming analysis is a determination as to whether or not the user equipment is entitled to operate with the visiting network.

2. A method as claimed in claim 1, wherein said message includes an attribute set in dependence on if the request is a request to register or a request to deregister.

3. A method as claimed in claim 2, wherein said message requests authorization of the user equipment from the home subscriber server.

4. A method as claimed in claim 2, wherein said request is a session initiation protocol register message.

5. A method as claimed in claim 1, wherein said visiting network is an interne protocol multimedia system.

6. A method as claimed in claim 1, wherein said user equipment comprises one of:
a mobile station; a personal digital assistant, portable computer; computer; mobile telephone.

7. A method as claimed in claim 1, wherein said visiting network is a wireless communications network.

8. Apparatus which is configured to
receive from an interrogating call session control function node of a home network at a home subscriber server of said home network a user authorization request message comprising an attribute indicating the result of a determination at said interrogating call session control function node as to whether a request to register to or from a visiting network a user equipment associate with said home network is a request to register or a request to deregister; and
carry out at said home subscriber server of said home network a roaming analysis only when said attribute comprised in said message indicates that said request is a request to register, wherein said roaming analysis is a determination as to whether or not the user equipment is entitled to operate with the visiting network.

9. Apparatus as claimed in claim 8, wherein said message includes an attribute set in dependence on if the request is a request to register or a request to deregister.

10. Apparatus being configured to:
receive at an interrogating call session control function node of a home network a message according to a first protocol and relating to a request from a user equipment associated with said home network;
determine if said request from said user equipment is a request to register or a request to deregister from a communication system, including checking information in an expires header field of said message, said expires header field having one value if the request is a request to register and a different value if the request is a request to deregister; and
generate a user authorization request message according to a second protocol different from the first protocol, and to send said message to a home subscriber server of said home network, said message comprising an attribute indicating if the user equipment is registering or deregistering, wherein the home subscriber server is configured to carry out a roaming analysis only when said attribute comprised in said message indicates that the user equipment is registering, wherein said roaming analysis is a determination as to whether or not the user equipment is entitled to operate with a network to which it is currently attached.

11. Apparatus being configured to:
receive at an interrogating call session control function node of a home network a message according to a first protocol and relating to a request from a user equipment associated with said home network;
determine if said request from said user equipment is a request to register to a visiting network or a request to deregister from a visiting network, including checking information in an expires header field of said message, said expires header field having one value if the request is a request to register and a different value if the request is a request to deregister; and
generate a user authorization request message according to a second protocol different from the first protocol, and to send said message to a home subscriber server of said home network, said message comprising an attribute indicating if the user equipment is registering or deregistering, wherein the home subscriber server is configured to carry out a roaming analysis only when said attribute comprised in said message indicates that the user equipment is registering, wherein said roaming analysis is a determination as to whether or not the user equipment is entitled to operate with said visiting network.

12. Apparatus according to claim 11, wherein said message to the home subscriber server includes an attribute readable by the home subscriber server and indicating if the user equipment is registering or deregistering.

13. Apparatus as claimed in claim 11, wherein said visiting network is an internet protocol multimedia system.

14. Apparatus as claimed in claim 11, wherein said visiting network is a wireless communication network.

15. A method comprising:
receiving at an interrogating call session control function node of a home network a message according to a first protocol and relating to a request from a user equipment associated with said home network;
determining if said request from said user equipment is a request to register to or deregister from a communications system, including checking information in an expires header field of said message, said expires header field having one value of the request is a request to register and a different value if the request is a request to deregister; and
generating a user authorization request message according to a second protocol different from the first protocol, and sending said message to a home subscriber server to said home network, said message comprising an attribute indicating if the user equipment is registering or deregistering, wherein the home subscriber server is configured to carry out a roaming analysis only when said attribute comprised in said message indicates that the user equipment is registering, wherein said roaming analysis is a determination as to whether or not the user equipment is entitled to operate with a network to which it is currently attached.

16. A method comprising:
receiving at an interrogating call session control function node of a home network a message according to a first protocol and relating to a request from a user equipment associated with said home network;
determining if said request from said user equipment is a request to register to a visiting network or a request to deregister from a visiting network, including checking information in an expires header field of said message, said expires header field having one value if the request is a request to register and a different value of the request is a request to deregister; and
generating a user authorization request message according to a second protocol different from the first protocol, and sending said message to a home subscriber server of said home network, said message comprising an attribute indicating if the user equipment is registering or deregistering, wherein the home subscriber server is configured to carry out a roaming analysis only when said attribute comprised in said message indicates that the user equipment is registering, wherein said roaming analysis is a determination as to whether or not the user equipment is entitled to operate with said visiting network.

17. A method according to claim 16, wherein said message to the home subscriber server includes an attribute readable by the home subscriber server and indicating if the user equipment is registering or deregistering.

18. A method as claimed in claim 16, wherein said visiting network is an internet protocol multimedia system.

19. A method as claimed in claim 16, wherein said visiting network is a wireless communication network.

* * * * *